United States Patent
Leffert et al.

(10) Patent No.: US 8,662,968 B2
(45) Date of Patent: Mar. 4, 2014

(54) AIR-BASED HYBRID BATTERY THERMAL CONDITIONING SYSTEM

(75) Inventors: Michael G. Leffert, Howell, MI (US); Tyler J Pilgeram, Commerce Township, Oakland County, MI (US); Ian L Hanna, Clarkston, MI (US); Eric L. Mayberry, Clarkston, MI (US); Jonathan R. Schwarz, Clawson, MI (US)

(73) Assignee: GM Global Technology Operations LLC, Detroit, MI (US)

(*) Notice: Subject to any disclaimer, the term of this patent is extended or adjusted under 35 U.S.C. 154(b) by 866 days.

(21) Appl. No.: 12/771,063

(22) Filed: Apr. 30, 2010

(65) Prior Publication Data

US 2011/0269387 A1   Nov. 3, 2011

(51) Int. Cl.
| | |
|---|---|
| B60H 1/00 | (2006.01) |
| B61D 27/00 | (2006.01) |
| B63J 2/00 | (2006.01) |
| B64D 13/00 | (2006.01) |
| B60H 1/34 | (2006.01) |
| B60W 20/00 | (2006.01) |
| B60H 3/00 | (2006.01) |

(52) U.S. Cl.
USPC .......... 454/75; 454/155; 180/65.275; 237/28; 165/42

(58) Field of Classification Search
None
See application file for complete search history.

(56) References Cited

U.S. PATENT DOCUMENTS

| | | | |
|---|---|---|---|
| 139,550 A | 6/1873 | Cronin | |
| 862,649 A | 8/1907 | Mower | |
| 1,104,816 A | 7/1914 | Miller | |
| 4,323,113 A | 4/1982 | Troyer | |
| 4,427,056 A * | 1/1984 | Johnson et al. | 165/42 |
| 4,453,591 A * | 6/1984 | Fehr | 165/42 |
| 4,458,583 A * | 7/1984 | Fukui et al. | 454/75 |
| 4,465,123 A * | 8/1984 | Sarsten et al. | 165/204 |
| 4,466,480 A * | 8/1984 | Ito et al. | 165/202 |
| 5,285,863 A | 2/1994 | Miki | |
| 5,802,862 A * | 9/1998 | Eiermann | 62/173 |
| 6,070,650 A * | 6/2000 | Inoue et al. | 165/42 |
| 6,198,174 B1 * | 3/2001 | Nims et al. | 290/52 |
| 6,290,266 B1 | 9/2001 | Kawano | |
| 6,761,037 B2 * | 7/2004 | Tsuboi et al. | 62/244 |
| 6,854,513 B2 * | 2/2005 | Shirota et al. | 165/203 |
| 7,024,871 B2 | 4/2006 | Zhu et al. | |
| 7,140,427 B2 * | 11/2006 | Honda et al. | 165/202 |
| 7,201,219 B2 * | 4/2007 | Ieda et al. | 165/202 |
| 7,348,741 B2 | 3/2008 | Minekawa et al. | |
| 7,669,647 B2 * | 3/2010 | Tsubone et al. | 165/202 |
| 2001/0042536 A1 * | 11/2001 | Borland | 123/298 |
| 2002/0039672 A1 * | 4/2002 | Aramaki | 429/22 |
| 2002/0043413 A1 * | 4/2002 | Kimishima et al. | 180/68.1 |
| 2003/0080714 A1 * | 5/2003 | Inoue et al. | 320/150 |
| 2003/0089100 A1 * | 5/2003 | Ueno et al. | 60/277 |

(Continued)

FOREIGN PATENT DOCUMENTS

CN    1621261 A    6/2005

Primary Examiner — Kang Hu
Assistant Examiner — Eric Gorman

(57) ABSTRACT

A thermal conditioning system for the energy storage system of a hybrid vehicle. At least one auxiliary air source, other than a permanently open air source, has a selectively operable actuator door which either connects or disconnects the auxiliary air source to the energy storage system blower, the air flow being selected to optimally temperature condition the energy storage system. The auxiliary air source preferably includes the HVAC ducting.

12 Claims, 6 Drawing Sheets

(56) References Cited

U.S. PATENT DOCUMENTS

| | | | |
|---|---|---|---|
| 2005/0029870 A1* | 2/2005 | Aridome | 307/10.1 |
| 2005/0111167 A1* | 5/2005 | Yamaguchi et al. | 361/676 |
| 2005/0132727 A1* | 6/2005 | Zhu et al. | 62/133 |
| 2005/0167169 A1* | 8/2005 | Gering et al. | 180/65.2 |
| 2005/0168180 A1* | 8/2005 | Minekawa et al. | 318/268 |
| 2007/0089442 A1* | 4/2007 | Tsuchiya | 62/186 |
| 2008/0028768 A1* | 2/2008 | Goenka | 62/3.2 |
| 2008/0071437 A1* | 3/2008 | Hirata et al. | 701/22 |
| 2008/0202137 A1* | 8/2008 | Inoue | 62/186 |
| 2009/0015205 A1* | 1/2009 | Katayama | 320/134 |
| 2009/0064695 A1* | 3/2009 | Kojima | 62/230 |
| 2009/0071178 A1* | 3/2009 | Major et al. | 62/239 |
| 2009/0078400 A1* | 3/2009 | Tamura et al. | 165/287 |
| 2009/0126901 A1* | 5/2009 | Hegar et al. | 165/41 |
| 2009/0133415 A1* | 5/2009 | Major et al. | 62/115 |
| 2009/0176150 A1* | 7/2009 | Yanaka | 429/120 |
| 2009/0192663 A1* | 7/2009 | Bennewitz | 701/29 |
| 2009/0195093 A1* | 8/2009 | Bandai et al. | 310/54 |
| 2009/0260905 A1* | 10/2009 | Shinmura | 180/68.1 |
| 2009/0317694 A1* | 12/2009 | Angquist et al. | 429/50 |
| 2010/0089547 A1* | 4/2010 | King et al. | 165/42 |
| 2010/0241308 A1 | 9/2010 | Kikuchi et al. | |

* cited by examiner

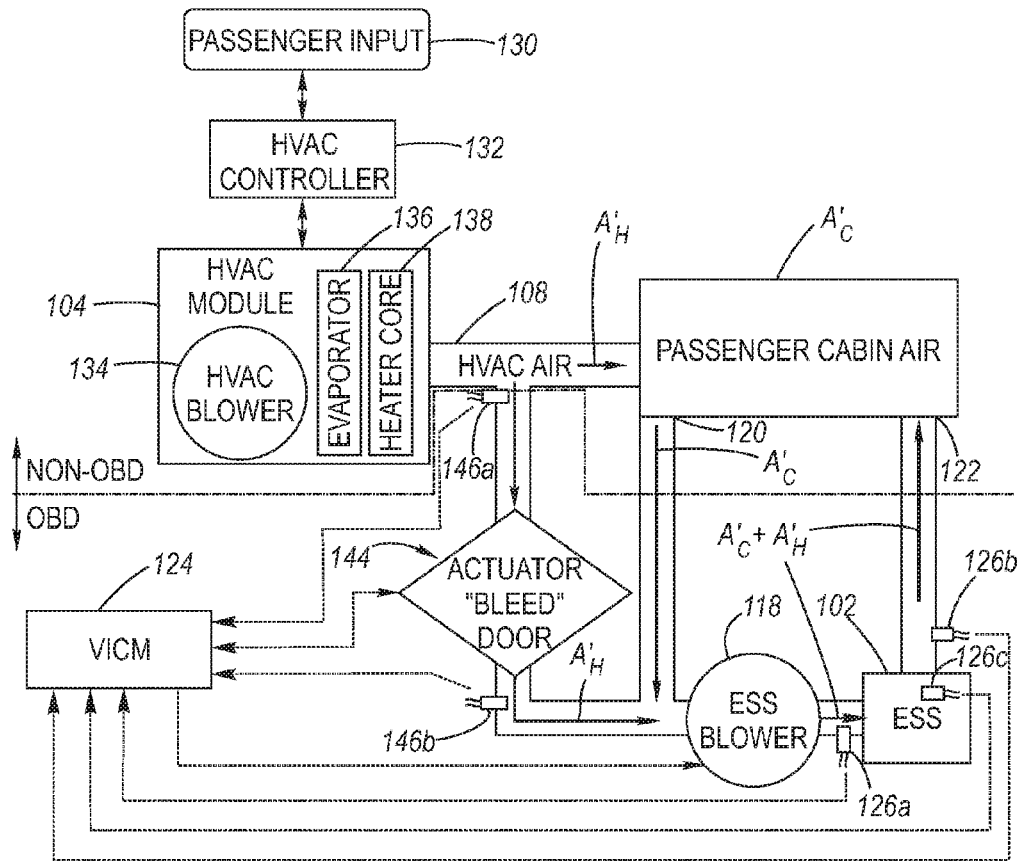
Fig. 5
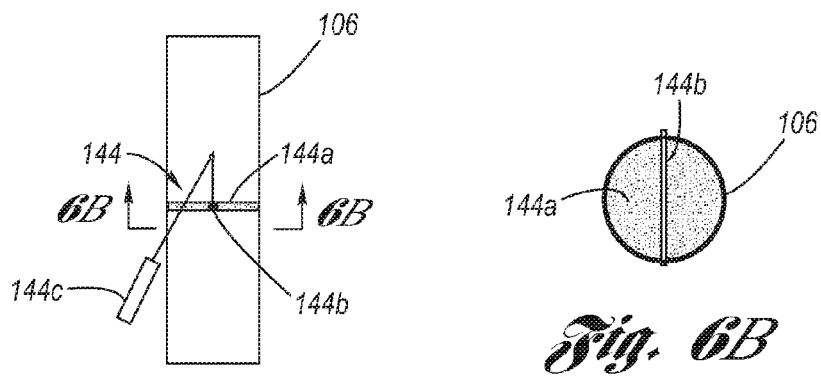
Fig. 6A
Fig. 6B

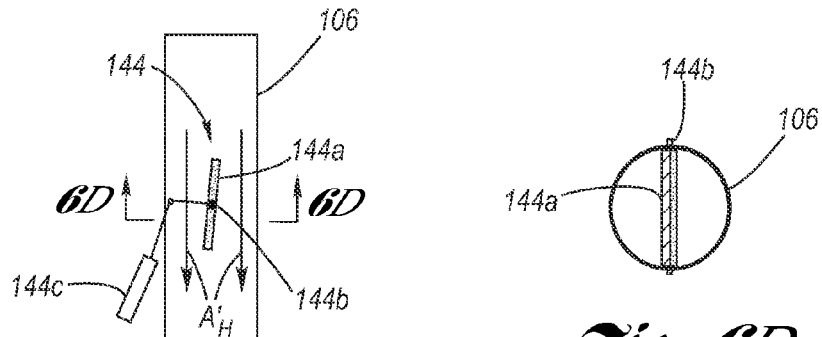
Fig. 6C
Fig. 6D
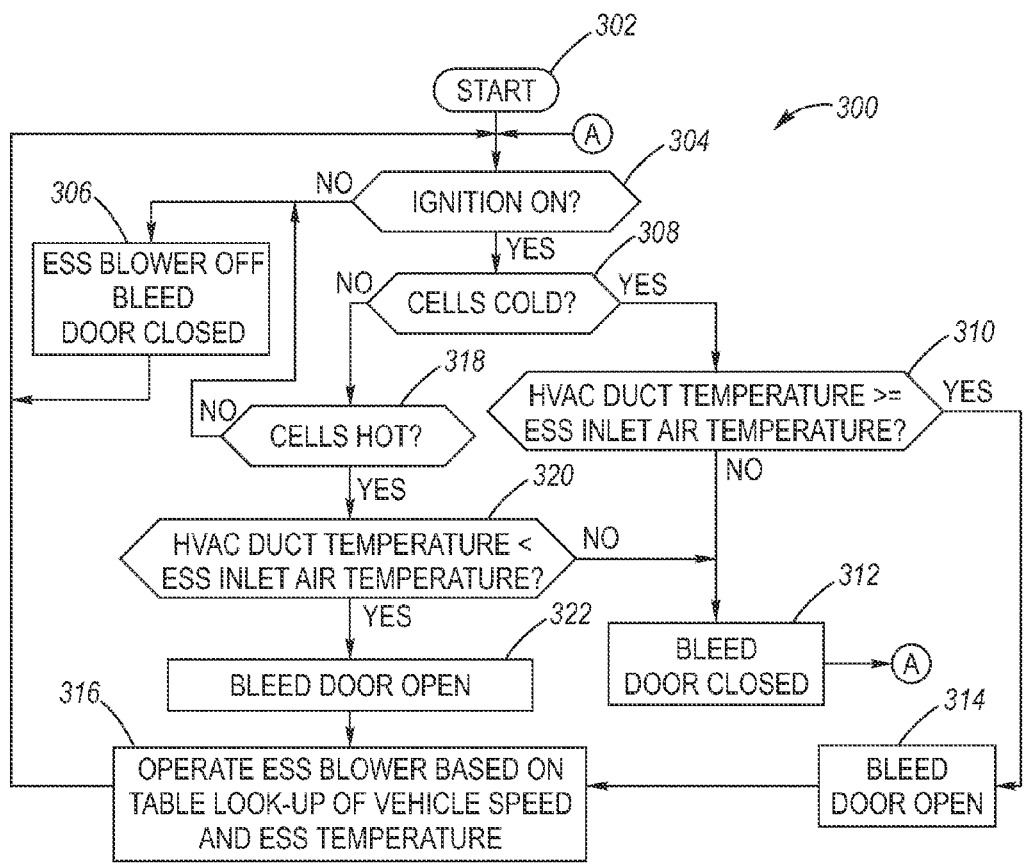
Fig. 7

AIR-BASED HYBRID BATTERY THERMAL CONDITIONING SYSTEM

TECHNICAL FIELD

The present invention relates to energy storage systems incorporating battery packs utilized in hybrid motor vehicles, and more particularly to the thermal conditioning thereof. Still more particularly, the present invention relates to thermal conditioning by selectively employing various air sources of the motor vehicle.

BACKGROUND OF THE INVENTION

Hybrid motor vehicles utilize a propulsion system which incorporates both an internal combustion engine and an electrical system which is used typically for propulsion and regenerative braking. The electrical system includes at least one electrical motor mechanically connected to one or more axles of the motor vehicle and a battery pack of cells which is an integrated component of an energy storage system (ESS) that is electrically connected to the at least one motor. When the at least one motor propels the motor vehicle, electrical energy is extracted from the ESS (the battery pack discharges). During regenerative braking the motor acts as a generator, and the electrical energy generated is delivered to the ESS (the battery pack charges).

FIGS. 1 and 2 schematically depict aspects of a conventional hybrid ESS and the prior art thermal conditioning arrangement therefor.

Within the passenger cabin 10 of the hybrid motor vehicle is disposed the ESS 12, which may, for example, rest on the vehicle floor 14 above the fore-aft floor "tunnel" 16. The ESS 12 is thermally conditioned by the movement of cabin air $A_C$ via an ESS blower 18, whereby the cabin air is circulated through the ESS, originating at least one permanently open entry vent 20 and exiting at least one permanently open exit vent 22, both vents being permanently open in the sense of being in permanently and completely open fluidic communication with the passenger cabin. The prior art has sometimes placed the entry vent near the output of the HVAC ducting, whereby cabin air $A_C$ and HVAC air $A_H$ can comingle before unselectively entering the entry vent. Operation of the ESS blower 18 is controlled by a hybrid vehicle integration control module (VICM) 24, utilizing temperature data from (among others) an inlet duct sensor 26a, an outlet duct sensor 26b, and an ESS temperature sensor 26c. The VICM 24 is connected to inputs and outputs by various data lines (see for example dashed lines in FIG. 2). These components are subject to an on-board diagnostics (OBD) requirement, whereby a signal is provided to the driver if a fault is detected in any of the components.

The passenger cabin includes a heating, ventilation and air conditioning (HVAC) module 28, which typically includes passenger input instruments 30 and an HVAC controller 32 which operates the HVAC module in response to the passenger input. Typically, the HVAC module includes an HVAC blower 34, an evaporator 36 for cooling the HVAC air to the cabin and a heater core 38 for heating the HVAC air to the cabin via HVAC ducting 40. These components are not subject to an OBD requirement.

Utilizing the cabin environment in the prior art to provide air for thermal conditioning of the ESS is effective only when the cabin air is not too hot nor too cold. For example, after a soak in hot sun or frigid cold, the ESS will be similarly either hot or cold, and the cabin air used to thermally condition the ESS will also be likewise hot or cold. This has problematic implications for the electrical charge/discharge performance of the ESS, which is temperature dependent. As discussed hereinbelow with respect to FIG. 3, there is an optimal ESS performance temperature range, and the cabin air temperature extremes can easily be outside (both above and below) this range.

And, this problem of administering ESS thermal conditioning in the prior art is not "solved" by merely placing the entry vent someplace near the outlet of the HVAC ducting, as the commingling of cabin air with HVAC air is haphazard, unselectable and takes too much time.

Accordingly, what remains needed in the art is a thermal conditioning system of hybrid vehicle ESS which does more than simply utilize cabin air therefor.

SUMMARY OF THE INVENTION

The present invention is an ESS thermal conditioning system which selectively utilizes air from at least one auxiliary air source (other than the at least one permanently open entry vent of the prior art), as for example one or more passenger cabin areas, the trunk, an exterior vent, and, most preferably, the HVAC ducting.

Interfaced with each auxiliary air source is a selectively operable actuator door which either connects or disconnects the auxiliary air source to the ESS blower. By way of example, VICM utilizes temperature sensors associated with each of the various auxiliary air sources to open, close, or partly open each of the respective actuator doors so that the ESS is optimally temperature conditioned. In this regard, if there are more than one auxiliary air sources available, then the VICM will select the actuator door opening amount appropriate to any of them based upon, for example, the sensed temperature at the auxiliary air source in relation to the sensed temperature of the cabin air, and either or both of the ESS and/or the ESS inlet. It should be noted that the VICM does not have any control of change in temperature available at any of the air sources.

In the most preferred form of the ESS thermal conditioning system according to the present invention, the selective auxiliary air source is the HVAC ducting. An HVAC ESS duct is interfaced with the HVAC ducting of the HVAC module. An actuator door, or "bleed" door, is fitted to the HVAC ESS duct, and is electrically operated anywhere between a closed position to an open position responsive to the VICM. The VICM operates the bleed door based upon its programming and data from temperature sensors on either side of the bleed door, and for example, other temperature sensors. In this manner, the temperature of the ESS can be kept within the optimal performance temperature range, or brought thereinto as quickly as possible. It should be noted that the VICM does not have any control of the HVAC module.

In operation, if the motor vehicle has experienced a cold soak, then the driver would be expected to select a heating mode for the HVAC module. The VICM would sense the temperature rise of the HVAC air in the HVAC ducting and thereupon open the bleed door to allow the ESS blower to duct-in (bleed) a selected portion of the HVAC conditioned air from the HVAC ducting. On the other hand, if the motor vehicle has experienced a hot soak, then the driver would be expected to select a cooling mode for the HVAC module. Now, the VICM would sense the temperature decline in the HVAC air and thereupon open the bleed door to allow the ESS blower to duct-in (bleed) a selected portion of the HVAC conditioned air from the HVAC ducting. When the optimal ESS performance temperature range of the ESS (and the passenger cabin) is present, the VICM will detect there is no need for HVAC air to assist thermal conditioning of the ESS and will close the bleed door, opening the door as needed to keep the temperature of the ESS within its optimal temperature range.

Accordingly, it is an object of the present invention to provide an ESS thermal conditioning system which selectively utilizes air from at least one auxiliary air source, most preferably the HVAC ducting.

This and additional objects, features and advantages of the present invention will become clearer from the following specification of a preferred embodiment.

BRIEF DESCRIPTION OF THE DRAWINGS

FIG. 5 is a schematic diagram of an HVAC module interfaced selectively with components associated with thermal conditioning of a hybrid vehicle ESS according to the present invention.

FIG. 6A is a schematic plan view of an HVAC ESS duct with the bleed door in its closed position.

FIG. 6B is a schematic view seen along line 6B-6B of FIG. 6A.

FIG. 6C is a schematic plan view of an HVAC ESS duct with the bleed door in its open position.

FIG. 6D is a schematic view seen along line 6D-6D of FIG. 6C.

FIG. 7 is an exemplar algorithm for carrying out the ESS thermal conditioning system according to the present invention, wherein the HVAC ducting is the selective auxiliary air source.

DESCRIPTION OF THE PREFERRED EMBODIMENT

Figure 3:
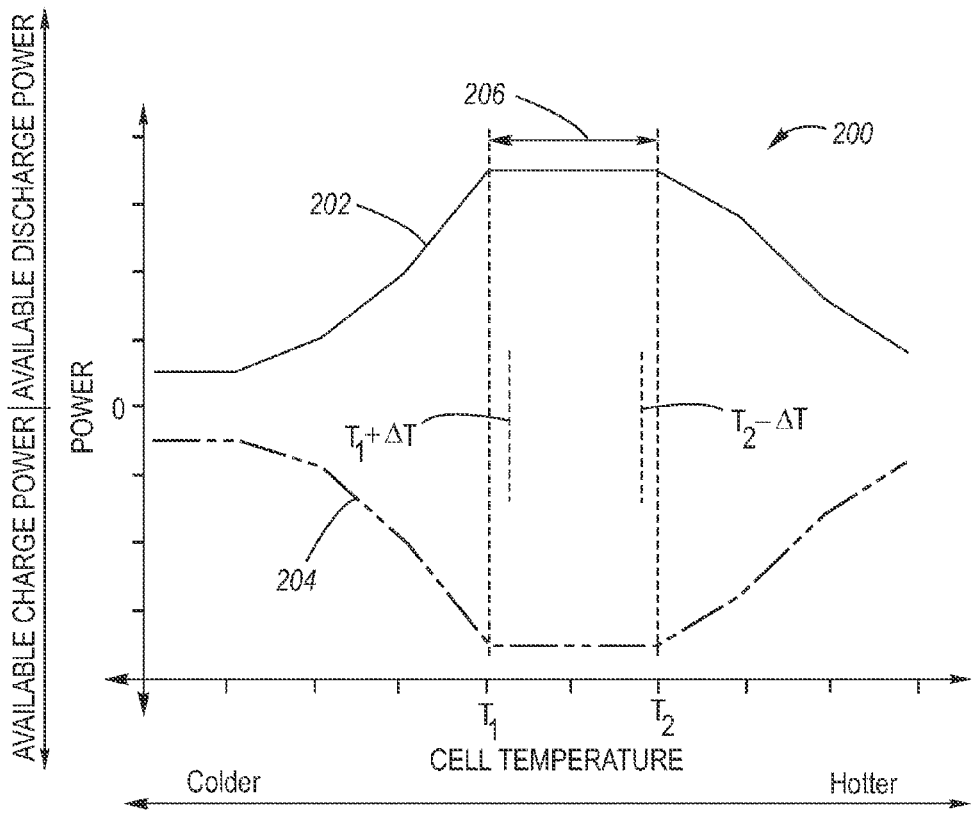
FIG. 3 is a graph of available ESS power as a function of battery pack cell temperature, showing plots for charge and discharge.
Figure 4:
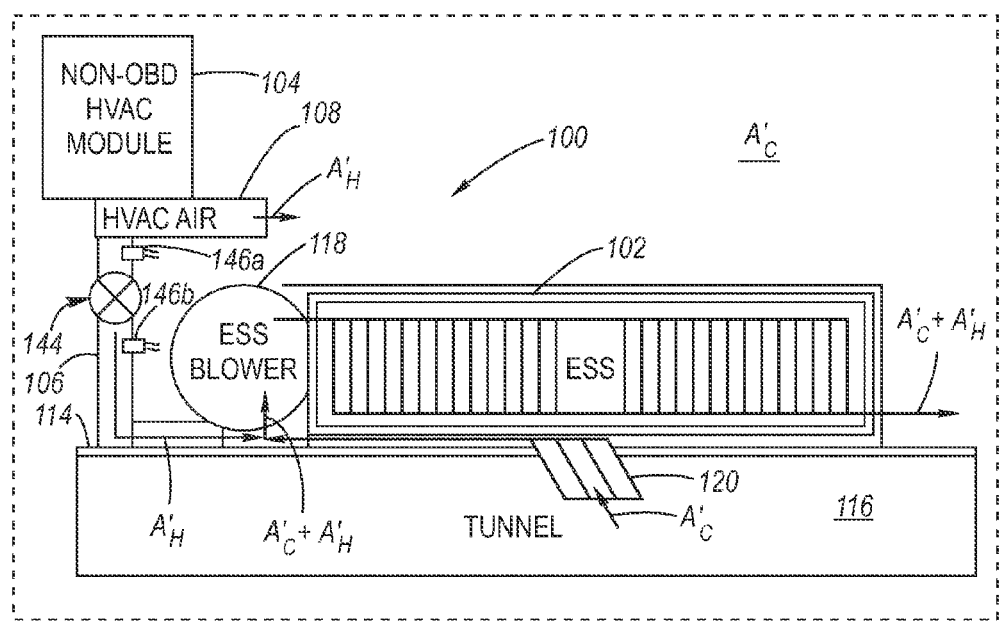
FIG. 4 is a schematic side view of a passenger cabin, showing an HVAC module interfaced with components associated with the thermal conditioning of a hybrid vehicle ESS according to a preferred example of the present invention.

Referring now to the Drawings, FIG. 3 depicts a graph 200 of power versus battery pack cell temperature of a typical hybrid vehicle ESS. Plot 202 depicts the available discharge power, and plot 204 depicts the available charge power. It is seen that there is a temperature range at which both plots 202, 204 plateau at a maximum, from temperature $T_1$ to temperature $T_2$, wherein this plateau defines an optimal ESS performance temperature range 206 (any particular ESS and its battery pack will have its particular optimal ESS performance temperature range which may vary from that shown in FIG. 3). For temperatures below $T_1$, the power availability of the battery pack in both charge and discharge modes decreases rapidly with decreasing temperature, and for temperatures above $T_2$, the power availability of the battery pack in both charge and discharge modes also decreases rapidly with increasing temperature. Therefore, it is highly desirable to keep the ESS within the optimal ESS performance temperature range (i.e., for the example of FIG. 3, the range 206 between $T_1$ and $T_2$), and indeed to keep the ESS from approaching even the limits of the range (i.e., for the example of FIG. 3, keeping the temperature of the ESS within about $T_1+\Delta T$ and $T_2-\Delta T$, where $+\Delta T$ may be, for example, about 5 C.), if at all possible.

The ESS thermal conditioning system according to the present invention performs the function of keeping the ESS temperature within the optimal ESS performance temperature range, or bringing the ESS temperature into this range as quickly as possible.

A preferred example of the ESS temperature conditioning system 100 is shown at FIGS. 4 through 7.

As mentioned, the passenger cabin includes a heating, ventilation and air conditioning (HVAC) module 104, which typically includes passenger input instruments 130 and an HVAC controller 132 which operates the HVAC module in response to the passenger input. Typically, the HVAC module includes an HVAC blower 134, an evaporator 136 for cooling the HVAC air to the cabin and a heater core 138 for heating the HVAC air to the cabin via the HVAC ducting 108. These components are not subject to an OBD requirement, being not controlled or influenced by the hybrid vehicle integration control module (VICM) 124.

Figure 1:
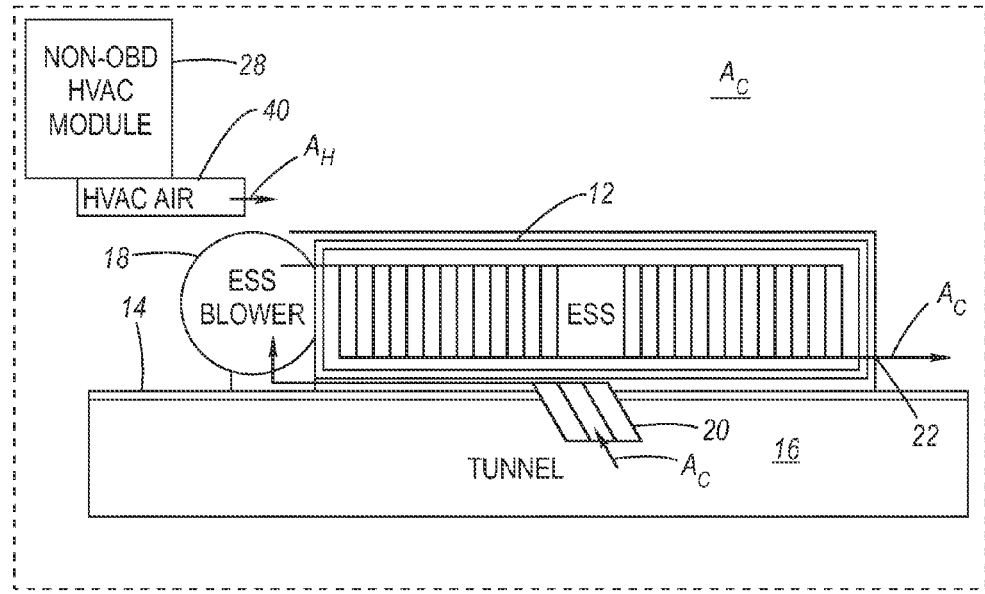
FIG. 1 is a schematic side view of a passenger cabin, showing an HVAC module and components associated with prior art thermal conditioning of a hybrid vehicle ESS.
Figure 2:
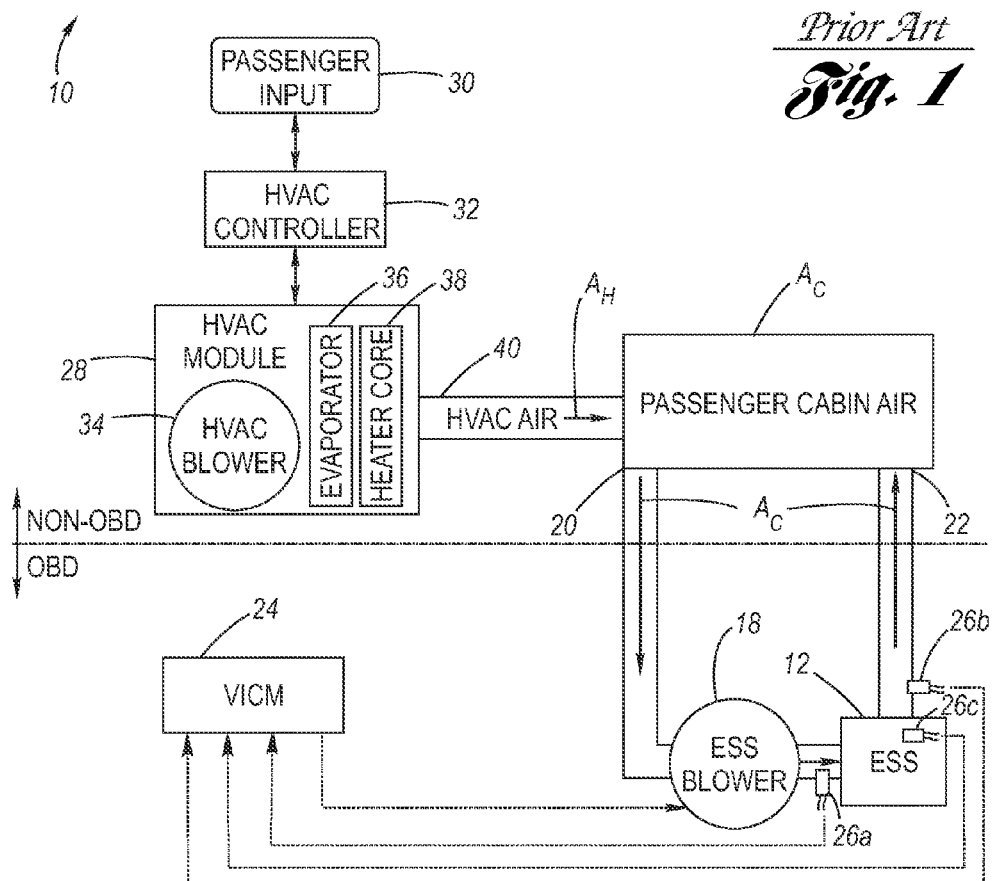
FIG. 2 is a schematic diagram of an HVAC module and components associated with prior art thermal conditioning of a hybrid vehicle ESS.

The ESS 102 and the HVAC module 104 are generally as described with respect to FIGS. 1 and 2, except now an HVAC ESS duct 106 is provided which communicates with the HVAC ducting 108 so that HVAC air $A'_H$ can be made selectively available to the ESS blower 110 and be mixed with the cabin air $A'_C$, which is always available.

As in FIGS. 1 and 2, within the passenger cabin 112 of the hybrid motor vehicle is disposed the ESS 102, which may, for example, rest on the vehicle floor 114 above the fore-aft floor "tunnel" 116. The ESS 102 is thermally conditioned, at least in part, by the movement of cabin air via an ESS blower 118, whereby the cabin air is circulated through the ESS, originating at least one permanently open entry vent 120 and exiting at least one permanently open exit vent 122, both vents being permanently open in the sense of being in permanently and completely open fluidic communication with the passenger cabin. Operation of the ESS blower 118 is controlled by the VICM 124, utilizing temperature data from (among others) an inlet duct temperature sensor 126a, an outlet duct temperature sensor 126b, and an ESS temperature sensor 126c. The VICM 124 is connected to inputs and outputs by various data lines (see for example dashed lines in FIG. 5).

The HVAC ESS duct 106 intersects the HVAC ducting 108 of the HVAC module 104 such that the HVAC air may bleed from the HVAC ducting into the HVAC ESS duct. An actuator door, or "bleed" door, 144 is fitted to the HVAC ESS duct 106, and is electrically operated selectively to position anywhere between a closed position to an open position responsive to the VICM 124. The VICM 124 operates the bleed door 144 based upon its programming and data from temperature upstream and downstream temperature sensors 146a, 146b disposed on either side of the bleed door, and may for example, utilize other temperature sensors.

The VICM 124, its associated data lines, the system sensors, including inlet and outlet duct temperature sensors 126a, 126b, and upstream and downstream temperature sensors 146a, 146b, and any actuator door position sensor (which can be incorporated into the actuator, i.e., as shown at 144c of FIGS. 6A and 6C), all constitute an electronic control system 142.

These non-HVAC module components are subject to an on-board diagnostics (OBD) requirement, whereby a signal is provided to the driver if a fault is detected in any of the components.

By way of example as shown at FIGS. 6A through 6D, the bleed door 144 may be a panel 144a having an area which matches the cross-sectional area of the HVAC ESS duct 106, which is nonotatably mounted to an axle 144b which is, itself, rotatably mounted to the HVAC ESS duct. The axle 144b is rotated by an actuator 144c which is electrically connected to the VICM 124.

In operation, if the motor vehicle has experienced a cold soak, for example sitting outside on a very cold night, then the driver would be expected to select a heating mode for the HVAC module 128. The VICM 124 would sense the temperature rise of the HVAC air in the HVAC ducting via the upstream temperature sensor 146a and thereupon open the bleed door 144 (as for example shown at FIGS. 6C and 6D) to allow the ESS blower to duct-in (bleed) a selected portion of the HVAC air $A'_H$ from the HVAC ducting to blend or mix with the cabin air $A'_C$, wherein the proportion of the HVAC air to cabin air is selected by the VICM and is effected by the selected position of the bleed door (i.e., being positioned more or less open). On the other hand, if the motor vehicle has experienced a hot soak, for example sitting outside on a hot, sunny day, then the driver would be expected to select a cooling mode for the HVAC module. Now, the VICM would sense the temperature decline in the HVAC air via the upstream temperature sensor 146a, and thereupon open the bleed door to allow the ESS blower to duct-in (bleed) a selected a portion of the HVAC conditioned air from the HVAC ducting to blend or mix with the cabin air $A'_C$, wherein, as mentioned above, the proportion of the HVAC air to cabin air is selected by the VICM and is effected by the selected position of the bleed door (i.e., being positioned more or less open).

In the mode where the bleed door 144 is open, the VICM 124 receives data from the downstream temperature sensor 146b, and compares to the data from the upstream temperature sensor 146a to ascertain that the bleed door is open and air is flowing (bleeding) properly from the HVAC ducting. If it is detected that there is a fault, then an OBD fault signal is provided to the driver.

When the optimal ESS performance temperature range of the ESS 102 (and the passenger cabin) is present, the VICM 124 will detect there is no need for HVAC air to assist thermal conditioning of the ESS and will close the bleed door 144. The re-opening of the bleed door is effected periodically as needed to keep the temperature of the ESS within its optimal temperature range and avoid as best as possible the extremes of the optimal temperature range.

Turning attention now to FIG. 7, an exemplar algorithm 300 for carrying out the preferred example of the ESS temperature conditioning system 100 will be described.

The algorithm is initiated at Block 302 and passes to Decision Block 304, whereat inquiry is made as to whether the engine ignition is on. If the answer to the inquiry is no, then the algorithm proceeds to Block 306, whereat the ESS blower is turned off and the bleed door is closed. The algorithm then returns to Decision Block 304.

Reconsidering Decision Block 304, if the answer to the inquiry thereat is yes, then the algorithm proceeds to decision block 308, whereat inquiry is made as to whether the cells of the battery pack of the ESS are cold or trending toward becoming cold, that is, below a predetermined temperature or trending theretoward, as for example a temperature almost at yet above, at, or below a lowest temperature at which available charge/discharge power is optimum (see discussion of FIG. 3, hereinabove). If the answer to the inquiry is yes, then the algorithm proceeds to Decision Block 310, whereat inquiry is made as to whether the HVAC air temperature is greater than or equal to the ESS inlet air temperature (i.e., the VICM compares the temperature data from the upstream temperature sensor 146a and the inlet duct temperature sensor 126a). If the answer to the inquiry is no, then the algorithm proceeds to Block 312 whereat the bleed door is closed, and the algorithm then proceeds back to Decision Block 304.

However, if the answer to the inquiry at Decision Block 310 is yes, then the algorithm proceeds to Block 314, whereat the bleed door is opened, and then proceeds to Block 316, whereat the VICM operates the ESS blower based for example upon a predetermined look-up table stored in the VICM. The algorithm then returns to Decision Block 304.

Reconsidering Decision Block 308, if the answer to the inquiry thereat is no, then the algorithm proceeds to Decision Block 318, whereat inquiry is made as to whether the cells of the battery pack of the ESS are hot or trending toward becoming hot, being above a predetermined temperature or trending theretoward, as for example a temperature almost at yet below, at, or above a highest temperature at which available charge/discharge power is optimum (see discussion of FIG. 3, hereinabove). If the answer to the inquiry is no, then the algorithm proceeds to Block 306, whereat the ESS blower is turned off and the bleed door is closed. The algorithm then proceeds back to Decision Block 304.

However, if the answer to the inquiry at Decision Block 318 is yes, then the algorithm proceeds to Decision Block 320, whereat inquiry is made as to whether the HVAC duct air temperature is less than the ESS inlet temperature (i.e., the VICM compares the temperature data from the upstream temperature sensor 146a and the inlet duct temperature sensor 126a). If the answer to the inquiry is no, then the algorithm proceeds to Block 312, whereat the bleed door is closed, and the algorithm then returns to Decision Block 304.

However, if the answer to the inquiry at Decision Block 320 is yes, then the algorithm proceeds to Block 322, whereat the bleed door is opened, and then proceeds to Block 316, whereat the VICM operates the ESS blower based for example upon a predetermined look-up table stored in the VCIM. The algorithm then returns to Decision Block 304.

Figure 8:
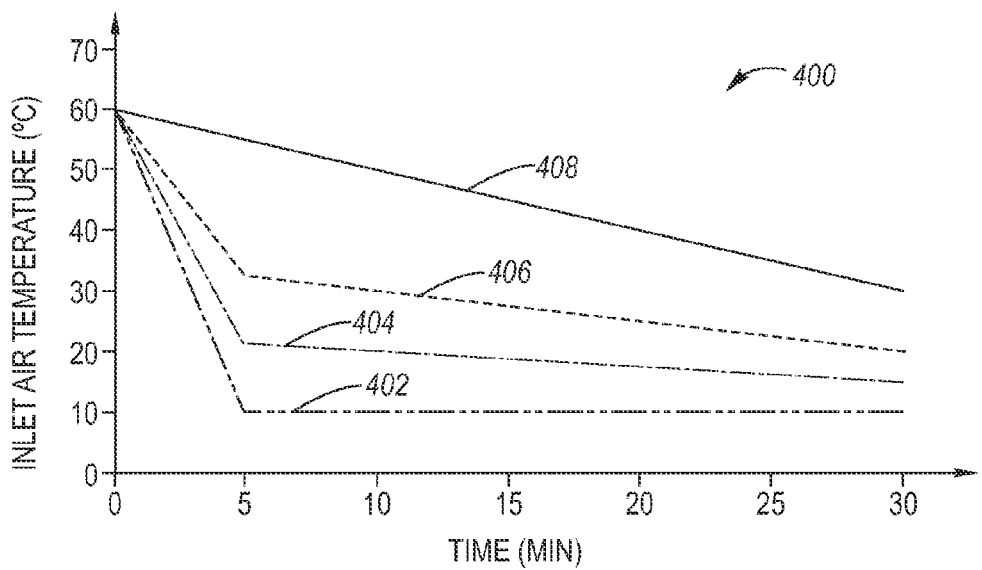
FIG. 8 is a graph of inlet air temperature versus time, including plots of selected proportions of HVAC conditioned air.
Figure 9:
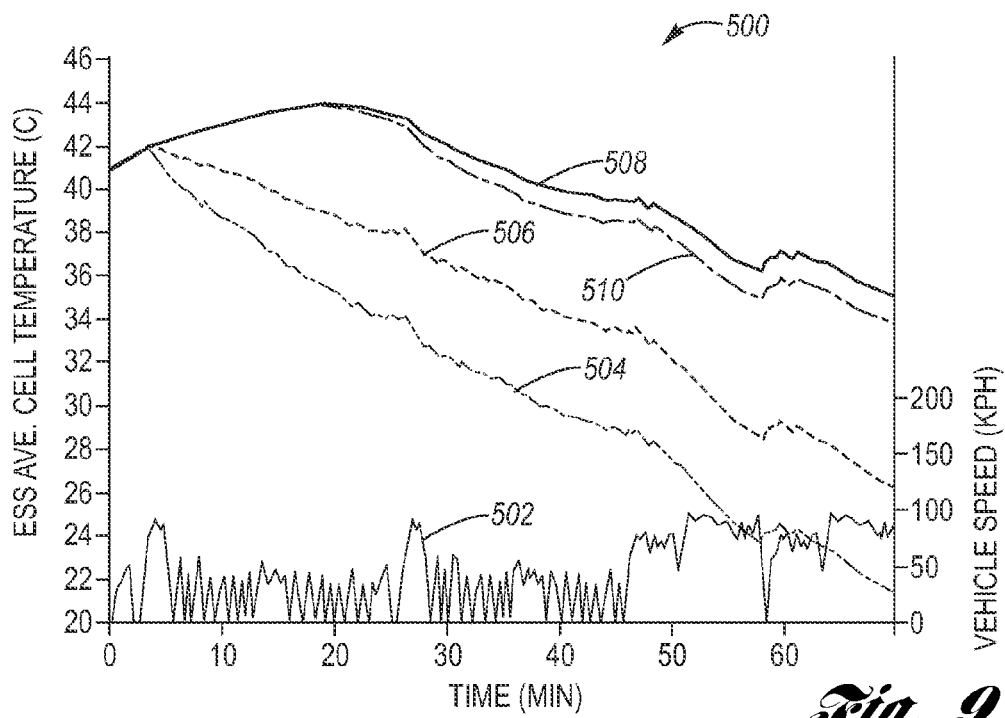
FIG. 9 is a graph of battery pack cell temperature versus time, including plots of selected proportions of HVAC conditioned air with respect to a selected motor vehicle operation event profile.

Temperature conditioning benefits to the ESS as a result of implementation of the above described preferred form of the present invention are graphically depicted at FIGS. 8 and 9.

FIG. 8 is a graph 400 of inlet air temperature versus time, depicting four plots, all with an initial temperature of 60 C. at initial time. The first plot 402 is indicative of change in HVAC air as a function of time. The second plot 404 is indicative of the change in ESS inlet temperature as a function of time, wherein the air delivery to the ESS is proportionally 75% HVAC air and 25% cabin air. The third plot 406 is indicative of the change in ESS inlet temperature as a function of time, wherein the air delivery to the ESS is proportionally 50% HVAC air and 50% cabin air. The fourth plot 408 is indicative of the change in ESS inlet temperature as a function of time, wherein the air delivery to the ESS is 100% cabin air. It is clear that the blending of HVAC air provides a quicker reduction in temperature of the ESS inlet air over that of only cabin air.

FIG. 9 is a graph 500 of ESS average cell temperature versus time, showing 5 plots after a hot solar soak. The start ESS inlet temperature (the cabin temperature) is 60 C., and the ESS cell temperature is 41 C. The first plot 502 is indicative of the speed of the motor vehicle during a driving event. The second plot 504 is indicative of the change in ESS cell temperature as a function of time, wherein the air delivery to the ESS is proportionally 75% HVAC air and 25% cabin air. The third plot 506 is indicative of the change in ESS cell temperature as a function of time, wherein the air delivery to the ESS is proportionally 50% HVAC air and 50% cabin air. The fourth plot 508 is indicative of the change in ESS cell temperature as a function of time, wherein the air delivery to the ESS is 100% cabin air at a base rate of flow. The fifth plot 510 is indicative of the change in ESS cell temperature as a function of time, wherein the air delivery to the ESS is 100% cabin air at a rate 30% higher than the base rate of flow. As in FIG. 8, it is clear that the blending of HVAC air provides a quicker reduction in temperature of the ESS over that of conventional cabin air.

Table I provides exemplar operational conditions of the ESS temperature conditioning system 100.

TABLE I

| Condition | HVAC Bleed | Cabin Inlet |
|---|---|---|
| ESS Min. | 100% | 0% |
| City driving | 75% | 25% |
| Hwy. Driving | 50% | 50% |
| ESS Max. | 40% | 60% |

Table II provides exemplar responses to certain fault conditions of operation by the ESS temperature conditioning system 100.

TABLE II

| System Condition | System Response |
|---|---|
| Bleed door stuck closed | OBD indicator on |
| Bleed door stuck midway | OBD indicator on, poss. lower ESS blower speed |
| Bleed door stuck open | OBD indicator on, poss. lower ESS blower speed |
| Bleed temp. sensor failure | OBD indicator on, switch to ESS inlet sensor |
| Bleed duct blocked/dislodged | OBD indicator on, command bleed door closed |

Figure 10:
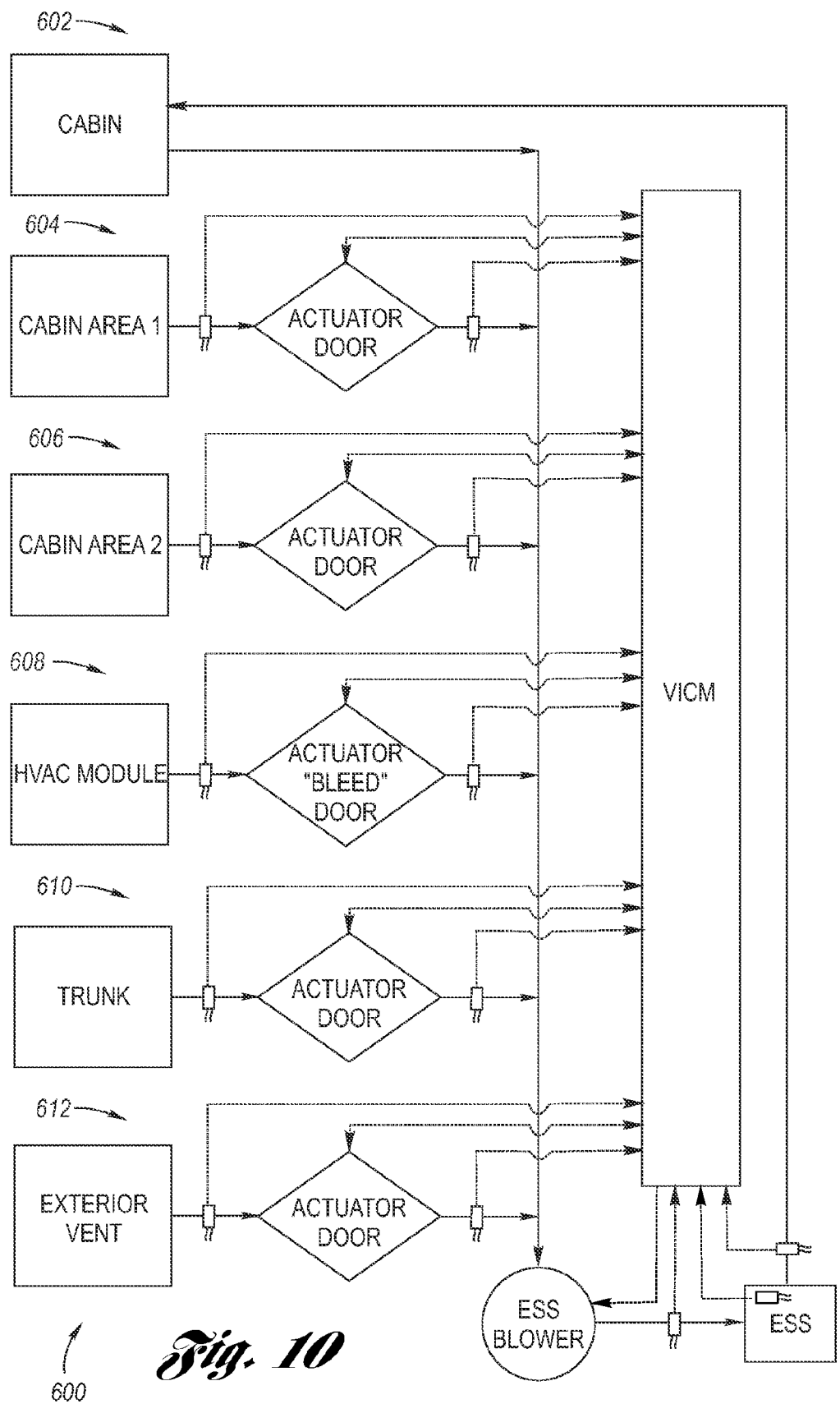
FIG. 10 is an exemplar schematic representation of a plurality of selective air sources in accordance with a second example of the present invention.

FIG. 10 depicts a schematic diagram of a non-limiting example of possible selective air sources of the ESS temperature conditioning system 600 according to the present invention, wherein other selective air sources may be utilized other than those illustrated.

Air source 602 is a conventional prior art air source, as for example shown at FIGS. 1 and 2 and discussed hereinabove. Selective air source 604 selectively draws air from a selected location of the cabin other than the conventional location of the one or more entry vents used by the conventional air source 602, as for example at the floor or the roof of the vehicle, wherein the selectivity depends upon the open or closed position of its actuator door per the VICM. Selective air source 606 draws air from another selected location of the cabin other than the conventional location of the one or more entry vents used by the conventional air source 602, as for example at the cargo area of a SUV, station wagon or van, wherein the selectivity depends upon the open or closed position of its actuator door per the VICM. Selective air source 608 selectively bleeds air from the HVAC, being the ESS thermal conditioning system 100 as described hereinabove. Selective air source 610 draws air from the trunk of the vehicle, wherein the selectivity depends upon the open or closed position of its actuator door per the VICM. Selective air source 612 draws air from an exterior vent, as for example at the engine compartment, wheel well or near the exhaust (safely away from exhaust gases), wherein the selectivity depends upon the open or closed position of its actuator door per the VICM. Since a plurality of auxiliary air sources are available, the VICM will select the actuator door opening amount which is most appropriate to any of them, respectively, based upon, for example, the sensed temperature at the auxiliary air source in relation to the sensed temperature of the cabin air, and either or both of the ESS and/or the ESS inlet.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A thermal conditioning system of a motor vehicle, comprising:
    a passenger cabin;
    an energy storage system;
    at least one permanently open entry vent in fluidic communication with said passenger cabin and with said energy storage system;
    at least one permanently open exit vent in fluidic communication with said passenger cabin and with said energy storage system;
    an electronic control system;
    at least one auxiliary air source other than said passenger cabin, each said auxiliary air source comprising:
        a duct in fluidic communication with a predetermined air source other than said at least one permanently open entry vent, said duct also being in selective fluidic communication with said energy storage system; and
        an actuator door selectively movable between a closed position and an open position with respect to said duct, wherein at said closed position said energy storage system is substantially free of fluidic communication with said predetermined air source with respect to said duct, and wherein said actuator door is selectively movable in response to said electronic control system; and
    a blower connected to said electronic control system and in fluidic communication with said energy storage system, with said at least one entry vent, with the respective said duct of each said auxiliary air source, and with said at least one exit vent;
    wherein said electronic control system comprises at each said auxiliary air source:
        an upstream temperature sensor disposed upstream of said actuator door and electrically connected to said electronic control system;
        a downstream temperature sensor disposed downstream of said actuator door and electrically connected to said electronic control system; and
        an actuator mechanically connected to said actuator door and electrically connected to said electronic control system, wherein said electronic control system actuates said actuator responsive to said upstream and downstream temperature sensors; and
    wherein said at least one auxiliary air source comprises a plurality of said auxiliary air sources; wherein said electronic control system moves each respective actuator door to a respectively selected position in order to provide a predetermined optimal thermal management of said energy storage system.

2. The thermal conditioning system of claim 1, further comprising a heating, ventilation and air conditioning module having ducting through which air from said heating, ventilation and air conditioning module fluidically communicates with said passenger cabin; wherein an auxiliary air source of said at least one auxiliary air source comprises the respective duct thereof intersecting said ducting, wherein the predetermined air source thereof comprises the air from said heating, ventilation and air conditioning module.

3. A method for thermal conditioning of an energy storage system of a motor vehicle, said thermal management system comprising the steps of:
   determining an optimal energy storage system performance temperature range;
   detecting a thermal condition of the energy storage system by an electronic control system;
   drawing air from a permanently open air source through the energy storage system in response to said steps of detecting and determining;
   sensing air temperature of at least one auxiliary air source other than the permanently open air source upstream of at least one predetermined air source switching location;
   sensing air temperature downstream of the at least one predetermined air source switching location; and
   selectively drawing air by an actuator mechanically connected to an actuator door from the at least one auxiliary air source at the at least one predetermined air source switching location and through the energy storage system in further response to said steps of detecting, determining and sensing;
   wherein said step of selectively drawing air comprises selectively varying the amount of the drawn air from at least one auxiliary air source in response to said steps of sensing;
   wherein said step of selectively drawing air, comprises selectively varying the amount of drawn air from a plurality of auxiliary air sources; and
   wherein said electronic control system moves each respective actuator door to a respectively selected position in order to provide a predetermined optimal thermal management of said energy storage system.

4. The method of claim 3, wherein said step of selectively drawing air, comprises selectively varying the amount of drawn air from a plurality of auxiliary air sources.

5. The method of claim 3, wherein said step of selectively drawing air comprises selectively varying the amount of drawn air from at least one of a passenger cabin area of the motor vehicle, a trunk of the motor vehicle, an exterior vent of the motor vehicle, and a heating, ventilation and air conditioning module of the motor vehicle.

6. The method of claim 3, wherein said step of selectively drawing air is performed so as to optimally retain the energy storage system within its determined optimal energy storage performance range.

7. The method of claim 3, wherein said step of selectively drawing air comprises selectively varying the amount of drawn air from a heating, ventilation and air conditioning module of the motor vehicle.

8. The method of claim 7, wherein said step of selectively drawing air is performed so as to optimally retain the energy storage system within its determined optimal energy storage performance range.

9. The method of claim 3, wherein said step of selectively drawing air further comprises selectively varying the amount of drawn air from at least one of a passenger cabin area of the motor vehicle, a trunk of the motor vehicle, and an exterior vent of the motor vehicle.

10. The method of claim 5, wherein said step of selectively drawing air comprises selectively varying the amount of drawn air from each of the at least one passenger cabin area of the motor vehicle, and the heating, ventilation and air conditioning module of the motor vehicle.

11. The method of claim 5, wherein said step of selectively drawing air comprises selectively varying the amount of drawn air from each of the at least one passenger cabin area of the motor vehicle, the trunk of the motor vehicle, and the heating, ventilation and air conditioning module of the motor vehicle.

12. The method of claim 5, wherein said step of selectively drawing air comprises selectively varying the amount of drawn air from each of the at least one passenger cabin area of the motor vehicle, the trunk of the motor vehicle, the exterior vent of the motor vehicle, and the heating, ventilation and air conditioning module of the motor vehicle.

* * * * *